United States Patent [19]
Bro et al.

[11] Patent Number: 5,227,018
[45] Date of Patent: Jul. 13, 1993

[54] GAS DISTRIBUTOR AND HEATER FOR SPRAY DRYING

[75] Inventors: Klaus Bro, Vedbak, Denmark; Ove Hansen, Columbia, Md.; Christian Schwartzbach, Maalov, Denmark

[73] Assignee: Niro A/S, Soeborg, Denmark

[21] Appl. No.: 789,400

[22] Filed: Nov. 8, 1991

Related U.S. Application Data

[63] Continuation of Ser. No. 412,741, Sep. 26, 1989, abandoned.

[51] Int. Cl.$^5$ .......................... B01D 1/18; F26B 17/10
[52] U.S. Cl. .................................... 159/4.02; 34/57 A; 34/57 R; 55/257.1; 159/16.1; 159/43.1; 159/48.1; 202/236; 203/90; 261/79.2; 261/89; 261/118; 261/141
[58] Field of Search .................... 159/4.02, 28.2, 16.1, 159/48.1, 43.1; 202/236; 203/90; 34/57 A, 57 R; 55/257.1; 261/79.2, 89, 118, 141

[56] References Cited

U.S. PATENT DOCUMENTS

| | | | |
|---|---|---|---|
| 1,989,406 | 1/1935 | Doolittle | 159/4.02 |
| 2,506,646 | 5/1950 | Komline | 159/4.02 |
| 2,953,199 | 9/1960 | Kohlins et al. | 159/4.08 |
| 3,499,476 | 3/1970 | Hartlapp | 159/4 |
| 3,621,902 | 11/1971 | Okada | 159/4 |
| 3,870,585 | 3/1975 | Kearns et al. | 159/4.02 |
| 4,187,617 | 2/1980 | Becker | 159/4 A |
| 4,227,896 | 10/1980 | Larsson | 55/260 |
| 4,421,594 | 12/1983 | Bildjukevich | 159/4 R |
| 4,530,822 | 7/1985 | Ashley et al. | 55/22 |
| 4,571,311 | 2/1986 | Ferguson, Jr. et al. | 159/4.01 |
| 4,702,799 | 10/1987 | Tuot | 159/48.1 |
| 4,893,752 | 1/1990 | Spink et al. | 239/427.3 |
| 4,968,490 | 11/1990 | Kowalski et al. | 159/48.1 |
| 5,064,501 | 11/1991 | Boersen | 159/48.1 |

FOREIGN PATENT DOCUMENTS

| | | | |
|---|---|---|---|
| 136297 | 7/1952 | Sweden. | |
| 0817520 | 7/1959 | United Kingdom | 159/4.02 |
| 1191032 | 5/1970 | United Kingdom. | |

Primary Examiner—Virginia Manoharan
Attorney, Agent, or Firm—Armstrong, Westerman, Hattori, McCleland & Naughton

[57] ABSTRACT

A gas distributor and heating device for a spray dryer which includes a feed liquid atomizer in a drying chamber, a gas distributor for supplying a uniform flow of gas, a guide duct for conveying the flow of gas from the gas distributor and to an outlet providing a flow of processing or drying gas to contact liquid droplets dispersed by the atomizer. A gas heater is located in the device between the gas distributor and the guide duct outlet to heat the gas just prior to its introduction into the spray chamber. This provides a high temperature drying gas close to the atomizer and avoids problems encountered in attempting to transfer a gas that has been heated at a location remote from the spray chamber. A guide duct in the form of an annular guide duct provides an annular flow of heated gas concentric with the atomizer. A gas burner extends circumferentially around the interior of the guide duct and is disposed to emit the gases of combustion in the direction of the outlet. The guide duct may also include a plate shielding a portion of the gas flow from direct contact with the burner and the gases of combustion to provide an insulating flow of gas between the annular duct and the combustion zone.

24 Claims, 6 Drawing Sheets

GAS DISTRIBUTOR AND HEATER FOR SPRAY DRYING

This application is a continuation of application Ser. No. 412,741 filed Sep. 26, 1989, now abandoned.

The present invention is directed to an improved gas distributor and heating device for a spray drying apparatus for drying of a feed solution and, more specifically, to an improved air distributor and heating device for directing a concentric flow of drying gas to a drying space in a drying chamber having an atomizing device.

BACKGROUND OF THE INVENTION

Spray drying is the transformation of a feed material from a fluid state into a dried particulate form by spraying the feed material into a hot drying medium. It is a one-step, continuous particle-processing operation involving drying. Background information relative to the field in which this invention finds application is provided in Spray Drying Handbook, third edition, K. Masters (John Wiley and Sons, New York).

The invention is applicable to spray drying, spray evaporation and spray reaction operations and processes which usually involve the introduction of a liquid feed material in the form of a solution or a suspension to an atomizing device which sprays small particles of the liquid feed material into a drying chamber where the droplets are dried or reacted and the resulting desired particulate material is collected and removed in the form of a powder. A rotary atomizing wheel which provides a continuous spray of the liquid droplets is often used at the top of a tower-type drying chamber. In addition to the droplets of liquid feed material, a processing gas in the form of a temperature controlled gaseous medium is also introduced to the tower-type drying chamber to evaporate the moisture from the liquid droplets and thus provide the desired particulate material.

Drying chambers of this type utilizing a rotary atomizer wheel and heated air introduced at the top of a drying chamber have been widely used to dry consumable food products, such as milk, to produce chemical products such as kaolin clay, titanium dioxide and calcium carbonate, and for processing waste effluents. Such processes are critically dependent upon the particle size of the material being dried, the temperature of the drying medium and the timely effective contact of each particle with the drying medium.

Rotary atomizer wheels or spray nozzles are generally used for spraying the feed material into the hot gas medium.

Various types of heating devices have been utilized to provide the hot gaseous medium. Gas heaters of the direct and indirect type have been utilized as well as steam, fuel oil, heat transfer fluids and electricity. Selection of a heat source for a particular process depends upon the product being spray dried as well as the availability, suitability and cost of the energy required in order to heat the gaseous medium. Open oil and gas fired burners may be utilized where products can withstand the high temperature generated by such heat sources as well as contact with the resulting products of combustion. Indirect heater utilizing electrical heating elements, gas or fuel oil burners may also be utilized to provide a hot gaseous medium when it is necessary to protect the product being sprayed from contact with products of combustion.

The processing or drying gas medium is delivered from a source to a gas distributor or distribution means from which it is supplied to the interior of the spray drying chamber. The gas is typically heated while moving through the delivery system by means of a burner or other heat source located in the gas delivery system before the gas is delivered to the gas distributor. The heated gas is then conveyed through insulated ducts to the gas distributor for introduction into the drying chamber and subsequent admixture with the feed spray.

A typical process and apparatus for providing a hot drying gas around an atomizing device in a spray drying chamber is disclosed in Pat. Nos. 3,621,902 and 4,227,896. In those processes, the gaseous medium is heated by means of a device located in the gas delivery system remote from the spray drying chamber. Pat. No. 4,227,896 also discloses an efficient gas distributor having a spiral supply duct and a plurality of vanes which provide a gas flow of substantially constant velocity through a conical guide duct.

Pat. No. 3,499,476 discloses a process for the production of particulate solids from a solution or suspension by nozzle spraying the feed material through a flame zone provided by an annular burner at the top of a spray tower. In this process, the gaseous products of combustion are introduced directly into the drying chamber with the liquid particles of feed material.

United Kingdom Patent Specification No. 1,191,032 discloses apparatus providing a preliminary drying zone wherein feed material is sprayed through a nozzle surrounded by a burner and the gases of combustion intermingle with the liquid particles of feed material. A secondary drying agent is delivered around the spray nozzle and gas burner.

Still another spray drying apparatus utilizing an air heater provided in a chamber located directly above a spray drying chamber is disclosed in Pat. No. 4,187,617. In that apparatus air is delivered by means of a fan through a transition duct to a distribution chamber located above the spray drying chamber. An air heater and a profile plate are provided in the distribution chamber together with a perforated diffuser. Cold air is delivered past the profile plate and heater to ensure that the air is uniformly heated and then received through the perforations in the diffuser and ducted to the spray drying chamber. The object of that apparatus is to ensure uniform heating of the air being introduced to the distribution chamber and both uniform temperature and flow of the heated air into the spray drying chamber.

Conventional systems of producing hot processing or drying gas using either direct or indirect heating means in the form of a furnace or combustion device and then ducting or delivering the hot gas from the heating area into the drying chamber by conventional air distributors are known in the art. Such conventional systems are suited for spray drying processes requiring drying gas temperatures which are not in excess of about 550° C. However, such conventional systems are seldom used in spray drying operations requiring drying gas temperatures near or in excess of 1000° C. since conventional systems would require the generation of substantial thermal energy remote from the point of use and extensive use of refractory materials in the delivery system between the heat source and a gas distributor adjacent the spray drying chamber.

One object of the present invention is to provide a gas heater and air distributor for high temperature spray drying systems which requires minimum refractory lining of the heating chamber and hot gas ducting or conveying surfaces. This object is achieved by providing the heat source directly upstream of the point of use in the spray drying chamber thus permitting delivery of a cold gas by conventional conduits to a gas distributor adjacent a spray chamber and then heating the gas supplied from the gas distributor as it is conveyed to the spray chamber. The high temperature, hot drying gas is conveyed directly into the drying chamber which minimizes the refractory material required since the high temperature drying gas is exhausted directly from the area where the gas is heated into the drying chamber.

The present invention is distinctly different from the apparatus disclosed in Pat. No. 3,499,476 and United Kingdom Specification No. 1,191,032 since the heat source and the flame of the present invention do not directly contact the liquid particles of feed material in the drying chamber and the particulate material will not be adversely effected by the products of combustion.

The spray drying apparatus of the present invention is also different from the apparatus disclosed by Pat. No. 4,187,617 since the gas diffuser or distributor in that apparatus is provided between the air heater and the spray nozzle. The apparatus of that patent would also be limited to spray drying processes utilizing drying gas heated to only a moderately high gas temperature on the order of 550° C. because of the diffuser and wire screens downstream of the air heater.

As will be more fully described here below, the apparatus of the present invention is particularly suited for use in high temperature spray drying of materials such as iron oxide pigments, magnesium chloride, and titanium oxide, or industrial waste effluents such as an acid solution of iron sulfate and magnesium sulfate wherein drying gas or hot air having a temperature in the range of 1000° C. or more is required.

Thus, one object of this invention is to provide a gas distributor, gas heater and atomizer for a high temperature drying system.

A further object of this invention is to provide a spray drying apparatus having a drying gas delivery system wherein the maximum amount of gas distribution is accomplished before the gas is heated to the desired temperature, the gas is then heated and conveyed directly to the spraying chamber.

A still further object is to provide a gas heater for receiving gas from a cold gas distributor and having an outlet exiting in the vicinity of the liquid droplets being discharged from an atomizer device.

A further object is to provide a hot processing or drying gas with its maximum temperature attained adjacent an atomizing device.

A still further object is to provide a gas heater for high temperature drying systems comprising a circularly disposed cold air distributor circumscribing and venting past a circumferential array of gas burners located in a circular passageway exiting in the vicinity of an atomizer device.

SUMMARY OF THE INVENTION

A gas distributor and heating device for a spray dryer of the type including a feed liquid atomizer at the top of a drying chamber which includes a gas distributor for supplying a flow of gas having a substantially uniform velocity, a guide duct for conveying the flow of gas from the gas distributor and having an outlet providing a flow of gas concentric with the atomizer, and a gas heater located in the device between the gas distributor and the outlet.

The guide duct for conveying the flow of gas from the gas distributor is preferably provided in the form of an annular guide duct defined by two spaced surfaces and the outlet provides an annular flow of heated gas concentric with a liquid atomizer. The spaced surfaces may be two radially spaced cylindrical surfaces or conical surfaces and, in the case of an annular guide duct defined by two spaced conical surfaces, the outlet directs an annular flow of heated gas converging toward a centerline of the guide duct. The spaced conical surfaces may be convergent or divergent or a combination of the two to control the velocity of the gas at the outlet of the guide duct. Spaced surfaces comprising a cylindrical surface and a conical surface may also be utilized.

In the preferred embodiments, the gas heater is one or a plurality of gas burners provided internally of an annular guide duct and extending circumferentially around the interior of the guide duct.

In the preferred embodiment, the gas burner is disposed to emit the gases of combustion in the direction of the outlet of the annular guide duct and may further include a plate or platen shielding a portion of the gas flow conveyed from the gas distributor from direct contact with the burner and the gases of combustion and thereby providing an insulating flow of gas between at least one side of the annular duct and the temperature of the burner and the gases of combustion.

In certain applications of the invention, it is also preferred that the gas burner is disposed to emit a flame in the direction of the outlet and the gas burner is located a greater distance from the outlet than a length of the flame emitted by the burner so as to ensure that the gases of combustion forming the flame are completely burned internally of the annular guide duct.

In a preferred embodiment of the invention, the gas distributor is provided in the form of a horizontal spiral supply duct of constantly decreasing cross section and having a plurality of vanes for uniformly distributing an annular supply of pressurized gas from the supply duct to the guide duct for conveying the flow of gas.

In an alternate embodiment of the invention, the gas distributor is provided in the form of a banjo shaped chamber having a circular portion and an arm extending radially relative to the circular portion and providing a supply inlet. The circular portion includes an annular outlet for supplying an annular flow of gas to the guide duct and at least one continuous circular perforated plate spaced between an interior surface of the circular portion and the annular outlet for distributing a uniform flow of gas from the supply inlet to the annular outlet.

In certain embodiments of the invention, a plurality of vanes are also provided internally of the guide duct to direct the flow of gas in a desired direction.

The gas distributor and heating device of the present invention may be utilized with atomizer wheels or spray nozzles. When used with an atomizer wheel, it is preferred that the guide duct provide an annular flow of heated gas concentric with the atomizer wheel. In applications using spray nozzles, it is preferred that a plurality of spray nozzles be arrayed at the top of a spray chamber and the guide duct provide a flow of heated gas substantially centered with the top of the spray chamber and concentric with the surrounding array of spray nozzles. The gas distributor and heating device may also be used with spray nozzles spraying from below in a fountain configuration.

The present invention and the advantages provided thereby will be more fully understood with reference to the following detailed description of the preferred embodiment taking in conjunction with the accompanying drawings.

DESCRIPTION OF THE PREFERRED EMBODIMENT

Figure 1:
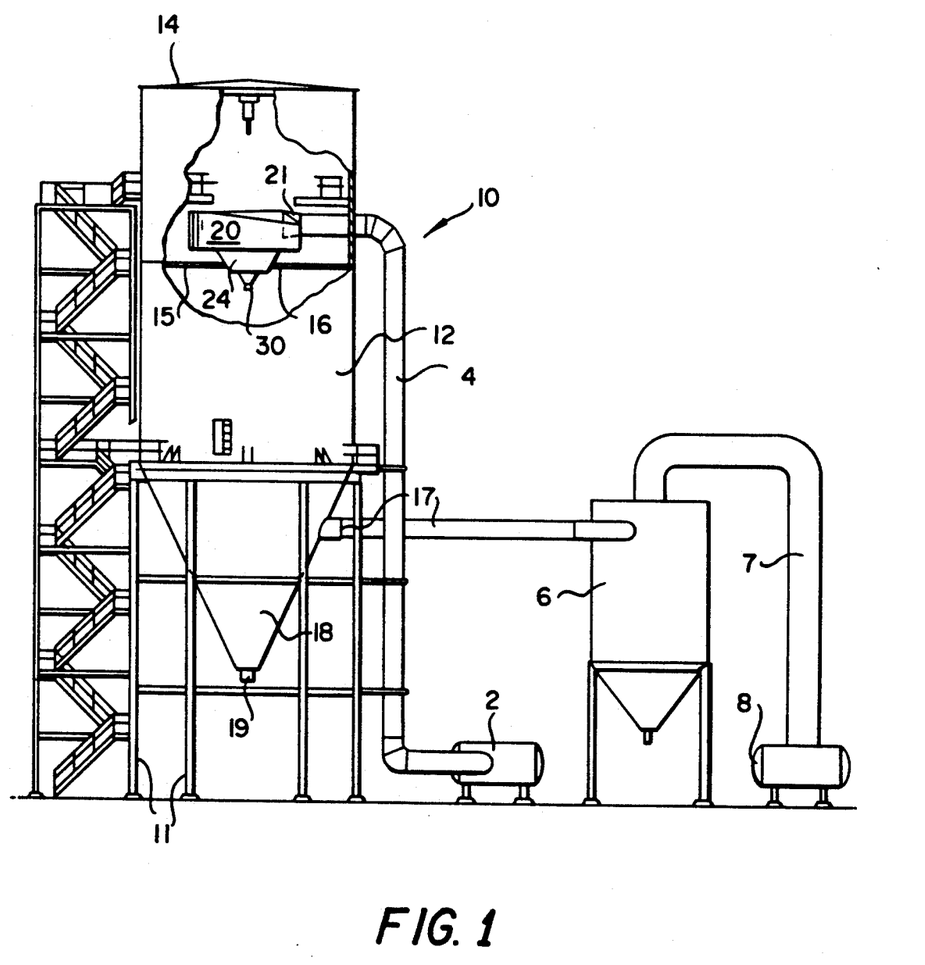
FIG. 1 is an elevation view, partly broken away, showing a spray drying plant utilizing one embodiment of the present invention.

With reference to the drawings wherein like reference numerals designate the same or like parts throughout, there is shown in FIG. 1 a spray drying plant designated by the reference numeral 10 which is particularly adapted for high temperature drying of an industrial waste effluent such as an acid solution derived as a waste product of a metal treating facility. The plant 10 is several stories high and includes a spray or drying chamber 12 and a penthouse 14 supported by means of a superstructure 11. The penthouse 14 provides an enclosure and work area for servicing a gas distributor 20 and rotary atomizing wheel 30 provided adjacent a roof or top closure 15 of the spray drying chamber 12. The spray drying chamber 12 has a cylindrical outer wall which is substantially closed at the top by the closure 15 and by a funnel or conical-shaped lower portion 18. An opening 16 is provided in the top closure 15 and a valve 19 is provided at the bottom of the lower portion 18 to permit removal of the particulate materials dried in the spray chamber 12. The spray chamber 12, opening 16 and the funnel-shaped lower portion 18 are substantially symmetrical about a vertical axis.

Figure 2:
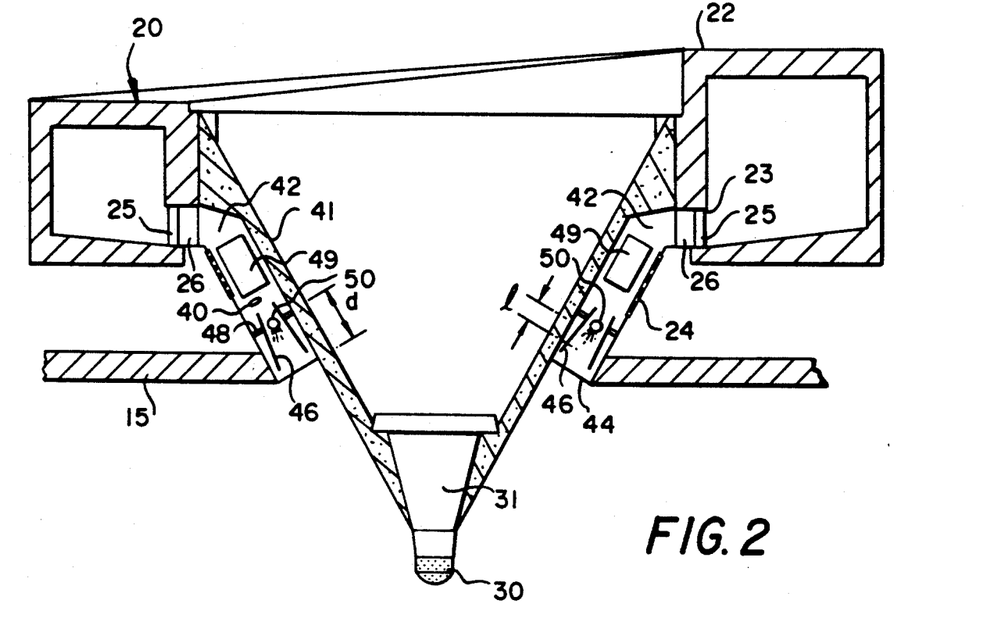
FIG. 2 is an enlarged sectional view showing the structure of a gas distributor and heating device of FIG. 1.

A gas distributor 20, as best shown by FIG. 2, is mounted in the penthouse 14 with a conical-shaped guide duct 40 depending to a position substantially aligned with the top closure 15 and centered in the opening 16. The rotary atomizer wheel 30 is rotatably mounted in a housing 31 supported internally of the gas distributor 20 to project into the top of the spray drying chamber 12.

Although the rotary atomizer wheel 30 is provided at the top of the spray drying chamber 12 in FIG. 1, the atomizer device may be one or more spray nozzles located at the top of the spray drying chamber or elsewhere in the spray drying chamber and spraying in the direction of the gas distributor 20.

A pressurized source of cold gas usually in the form of ambient air is provided to the gas distributor by means of a fan 2 and inlet or delivery duct 4 connected to the gas distributor 20. An outlet or exhaust port provided in the funnel shaped lower portion 12 at one side of the plant is connected by means of an exhaust duct or pipe 17 to a fines separator 6 which may be in the form of a cyclone separator. The fine particles are retained in the separator 6 where they may be periodically withdrawn and the gas is exhausted through a conduit 7 to an exhaust fan 8 where the gas may be exhausted to atmosphere or recycled by duct work to the fan 2. The fan 2 and inlet duct 4 comprise a delivery system for delivering cold processing gas to the gas distributor 20. The outlet duct 17, separator 6, exhaust duct 7 and exhaust fan 8 comprise means for withdrawing the processing gas from the spray chamber 12.

Figure 3:
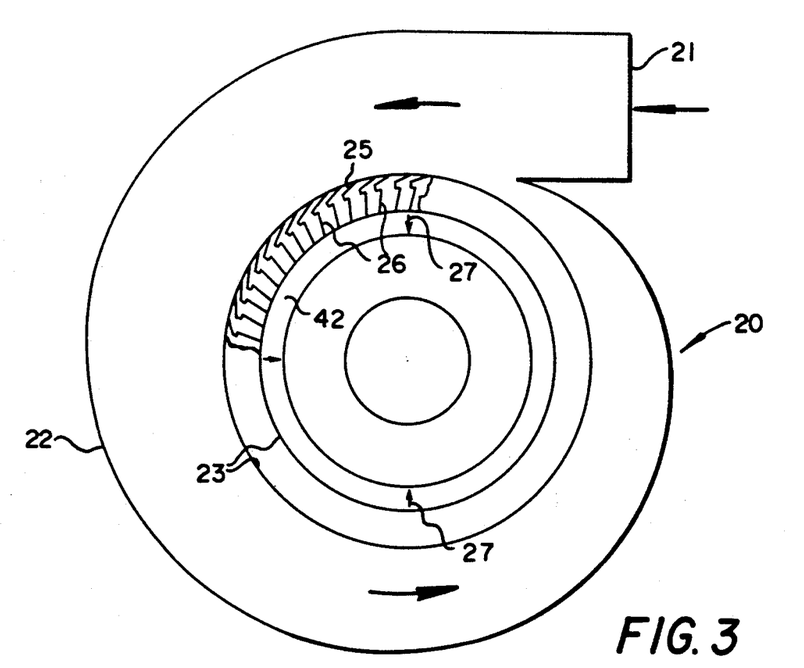
FIG. 3 is a plan view showing the interior of the gas distributor of FIG. 2.

The gas distributor 20 is of the type disclosed in Pat. No. 4,227,896 and includes an inlet 21 opening to a spiral supply duct 22 which is internally opened to an annular transition zone 23. The transition zone 23 includes two succeeding sets of stationary guide vanes 25 and 26. The vanes 25 are shaped to deflect the flow of gas from a purely tangential flow as indicated by the arrows adjacent the inlet 21 to a flow direction as shown by the arrows 27 in which the radial velocity component toward a center axis of the gas distributor 20 exceeds the tangential velocity component and the vanes 26 of the other set project into a space between the vanes 25 and extend substantially parallel to the direction which the gas flow has been deflected by the adjacent vane 25. The vanes 25 and 26 in the annular transition zone change the direction of flow of the gas supplied to the gas distributor 20 and direct the gas to a mouth 42 of an annular guide duct 40 while the vanes 26 also minimize turbulance in the flow. As best shown by FIGS. 2 and 3, the internal dimensions or volume of the spiral duct 22 constantly decreases in the direction of gas flow from the inlet 21 around the annular transition zone so as to supply a substantially constant volume and velocity of gas moving from the spiral duct through the annular transition zone 23 to the mouth 42 of the annular guide duct 40.

The annular guide duct 40, as best shown by FIG. 2, is comprised of a hollow conical shaped insulating member 41 which may also provide support for the atomizer wheel drive housing 31. A conical shaped plate 24 is radially spaced from the insulating member 41 and the annular guide duct 40 is provided in the conically shaped radial space between the insulating member 41 and the plate 24.

A ring shaped or annular gas burner 50 is also provided internally of the annular guide duct 40 between the insulating member 41 and plate 24. As shown by FIG. 2, the gas burner 50 is disposed to emit the gases of combustion or direct the flame in the direction of the outlet 44 of the annular guide duct 40.

In the preferred embodiment, an annular plate 46 or series of plates are provided around the interior of the annular guide duct 40 between the gas burner 50 and the outer metal plate 24 to deflect a portion of the gas supplied by the gas distributor around the burner 50 and serve as a heat shield between the burner and the outer plate 24. The plate 46 may be attached at 48 to the outer conical plate 24 and shields a portion of the gas flowing from the gas distributor from direct contact with the burner and the flame or gases of combustion emitted by the burner. The plate 46 thus provides an insulating flow of cold gas between the metal plate 24 providing one side of the annular guide duct 40 and the temperature of the burner and the gases of combustion.

The feature of cooling one or both of the walls of the annular guide duct by means of an insulating flow of cold gas is an important feature particularly in extremely high temperature drying applications of the present invention. For example, in a process for spray drying industrial waste effluents, it may be desirable to convey gas heated to a temperature in the range of about 700° to 1200° C. in order to dry the desired material. The temperature of a flame issuing from a burner such as the burner 50 shown by FIG. 2 may be as high as 2,000° C. Such high temperatures significantly limit the choice of materials which may be utilized in a structure adjacent such a high temperature flame. Although a number of ceramic and refractory materials are capable of withstanding such high temperatures, some of the materials are not capable of providing long term service in such a high temperature environment and such materials are both heavy and difficult to work with and the most temperature resistant materials are relatively expensive. Thus, although ceramic and refractory materials may be used for flame and high temperature resistance, it is of course desirable to have other devices and arrangements whereby more conventional high temperature steel plates :ay be suitably formed and used in such environments. This is significant since most high temperature steel and other metal plate materials cannot withstand temperatures greater than about 550° C., and therefore special arrangements or devices must be provided if one wishes to obtain the low cost and fabrication advantages offered by such materials. The heat shield guide plates or deflector plates 46 which provide an insulating flow of cool gas between the burner 50 and the outer conical plate 24 of the annular duct 40 provide such an advantageous arrangement.

The temperature of the flame or gases of combustion emitted from the burner 50 with 20% surplus air is on the order of about 1700° C. By appropriately spacing and positioning the guide plates 46 in the annular guide duct 40 to bypass 40% of the air supplied by the gas distributor 20 around the burner 50, the average gas temperature after mixing in the vicinity of the outlet 44 will be on the order of 1200° C. with the advantage that the insulating air flowing between the guide plate 46 and the outer conical plate 24 of the annular guide duct 40 will have served to thermally insulate the outer conical plate 24 from the high temperature of the flame and also provide a cooling effect to the guide plate 46 as the air flows past or through that plate. If 50% of the air is bypassed around the burner 50 and flame, the gas temperature after mixing will be on the order of about 1000° C. and if 68% of the air is bypassed, the temperature of the gases after mixing will be about 715° C. Thus, substantial amounts of the air supplied by the gas distributor 20 may be bypassed around the burner 50 for cooling purposes and still provide a gas mixture at the outlet 44 of the annular duct 40 that has a temperature in the range of between about 715° C. and 1200° C.

The length of the flame or gases of combustion to be emitted from a burner such as the burner 50 shown in FIG. 2 can be calculated or determined by experimentation. In the embodiment shown in FIG. 2, the burner 50 is positioned in the annular outlet 40, a distance d from the outlet 44 of the annular guide duct 40 which is greater than the flame length 1. This in turn ensures that the droplets of feed solution being dispersed by the atomizer wheel 30 will only be contacted by hot gas conveyed through the annular guide duct 40 and never have direct contact with the flame.

In other embodiments, the burner 50 may be positioned in the annular outlet 40, a distance d from the outlet 44 which is only ½ to ⅔ the flame length to permit the flame tip; i.e., the maximum temperature of the flame, to project out of the guide duct 40 without impinging on the spray issuing from the atomizing device.

In the preferred embodiment, a plurality of directional vanes 49 are also spaced circumferentially around the annular guide duct 40. The directional vanes 49 may be fixed in place or adjustable to direct the flow of gas conveyed through the annular guide duct 40 in a desired direction. That is, after the gas has been uniformly distributed and supplied to the mouth 42 of the annular guide duct 40, it may be desirable to change the direction of gas flow so as to not only converge toward but rotate around the atomizer wheel 30. Directional vanes such the vanes 49 would be located in the flow of gas downstream from the vanes 25 or such other means as may be utilized for uniformly distributing the gas delivered to the annular guide duct 40 and upstream of the gas burner 50 so as not to interfere with the uniform distribution of the gas flow on the one hand and to avoid exposure to the high temperature of the gas burner and flame on the other hand.

The operation of the high temperature, waste effluent spray drying plant shown by FIGS. 1-3 will now be briefly described. A source of pressurized ambient air is provided by the compressor 2 and inlet 4 to the gas distributor 20 where it is uniformly distributed around and supplied with a substantially uniform velocity to the mouth 42 of the annular guide duct 40. The annular guide duct 40 serves as means for conveying the flow of gas from the gas distributor 20 to the outlet 44 in a flow that converges toward the atomizer wheel 30. The gas burner 50 is located internally of the annular guide duct 40 between the gas distributor 20 and the outlet 44 and heats the gas conveyed through the annular guide duct 40 to a predetermined temperature suitable for drying droplets of a feed solution dispersed by the atomizer wheel 30. The industrial waste effluent in the form of a liquid feed solution is conveyed by conventional means to the atomizer wheel 30 where it is dispersed in the form of small droplets and is distributed by centrifugal force radially across the top of the spray chamber 12 thereby forming an atomization zone radially outward of the atomizer wheel 30. The high temperature gas conveyed by the annular duct 40 converges toward the atomizer wheel 30 and evaporates the liquid content of the droplets permitting the solids to fall to the funnel shaped lower portion 18 where they may be removed. The drying gas is withdrawn through the outlet or exhaust conduit 17 and delivered to a separator 6 where fine particles retained in the drying gas may be recovered. The gas is then withdrawn from the separator 6 through the conduit 7 by exhaust fan 8 where the gas may be exhausted to atmosphere or returned partly as source gas to the fan 2. In the event that other gases may be released from the droplets of feed solution and mixed with the drying gas, it may of course be desirable to provide a scrubber or other device to separate the additional gases released during the drying process from the drying gas before the drying gas is exhausted to atmosphere or returned to the compressor.

Although the operation of the spray drying plant as shown in FIG. 1 has been described in terms of providing a source of cold gas or air to the gas distributor 20, it should of course be understood that the drying gas provided to the gas distributor 20 may be warm or preheated and then the burner 50 serves to increase the temperature of the warm or preheated source gas to the desired temperature.

Figure 4:
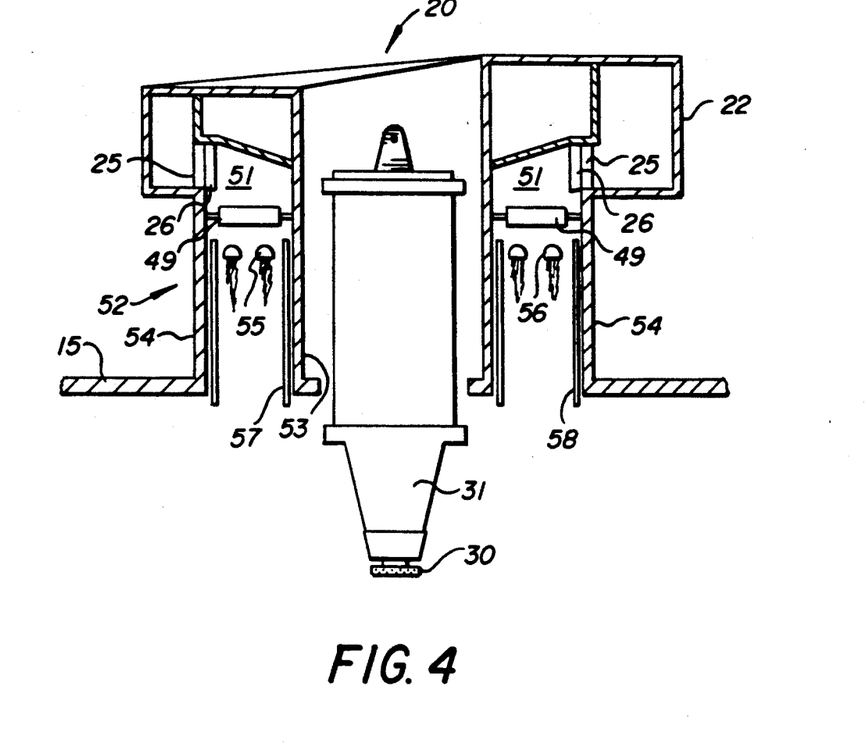
FIG. 4 is a view similar to FIG. 2 showing an alternate guide duct for heating and conveying gas supplied by a gas distributor as shown by FIGS. 1 and 3.
Figure 5:
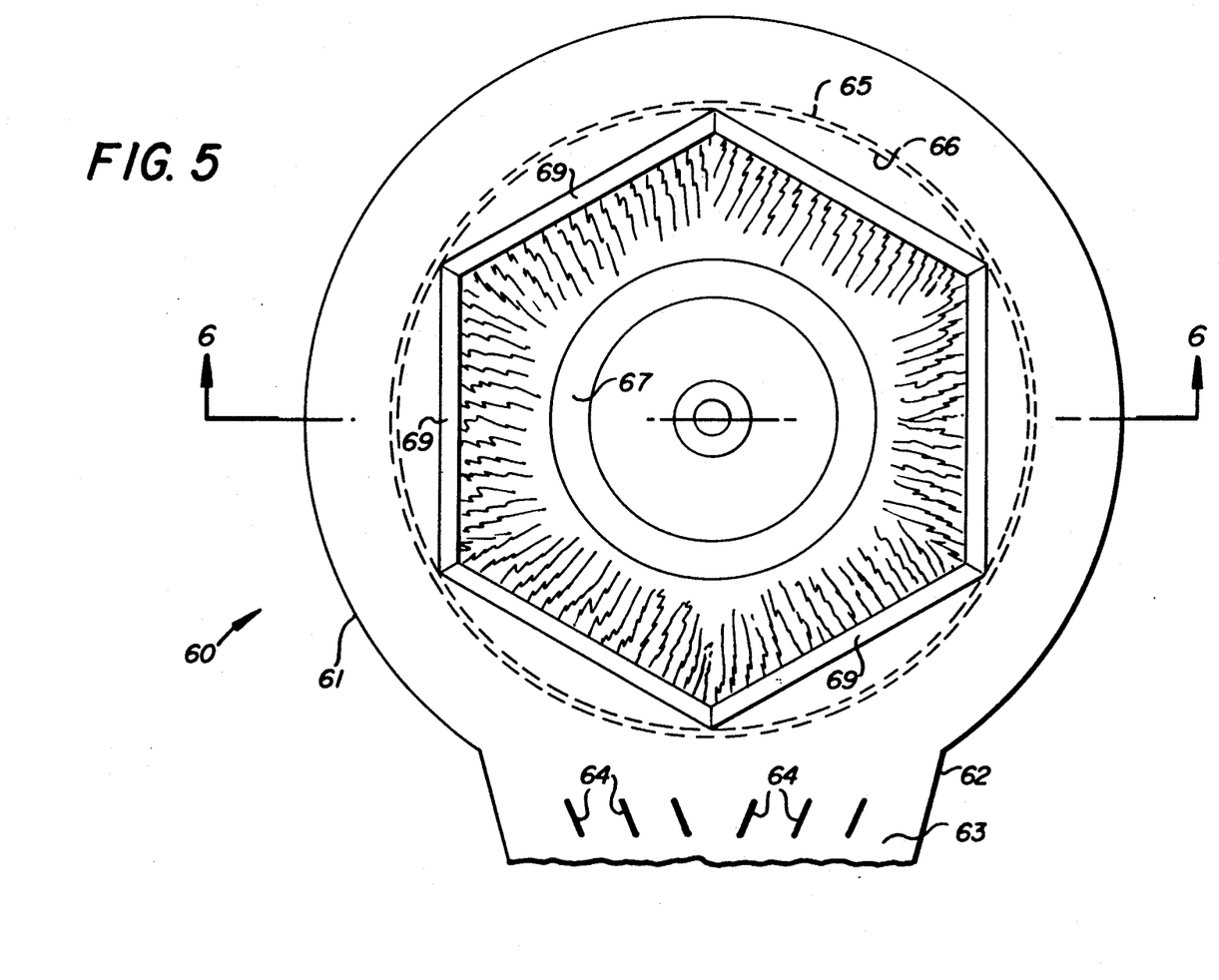
FIG. 5 is a plan view similar to FIG. 3 showing an alternate gas distributor and heating device.
Figure 6:
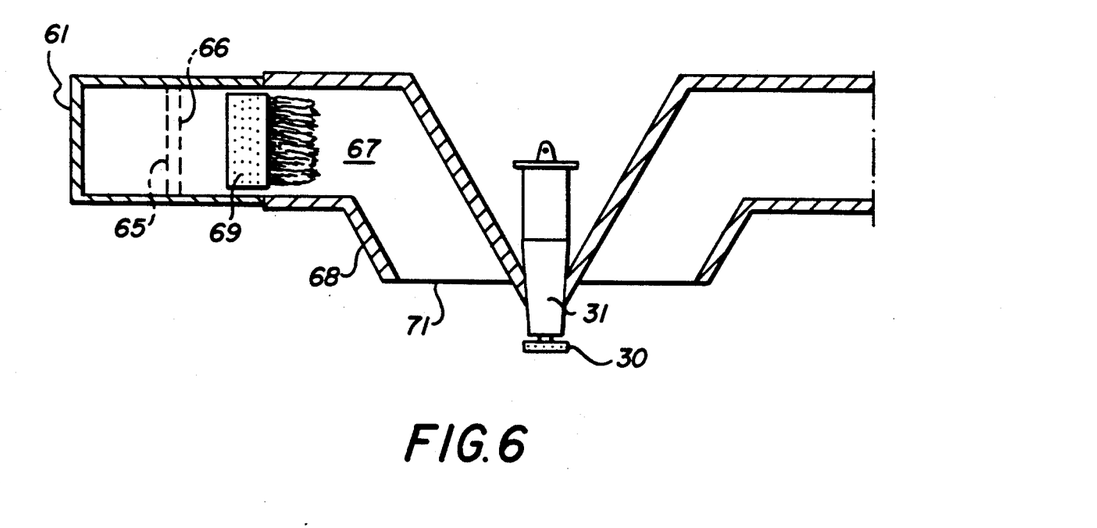
FIG. 6 is a sectional view taken along line VI—VI of FIG. 5.
Figure 7:
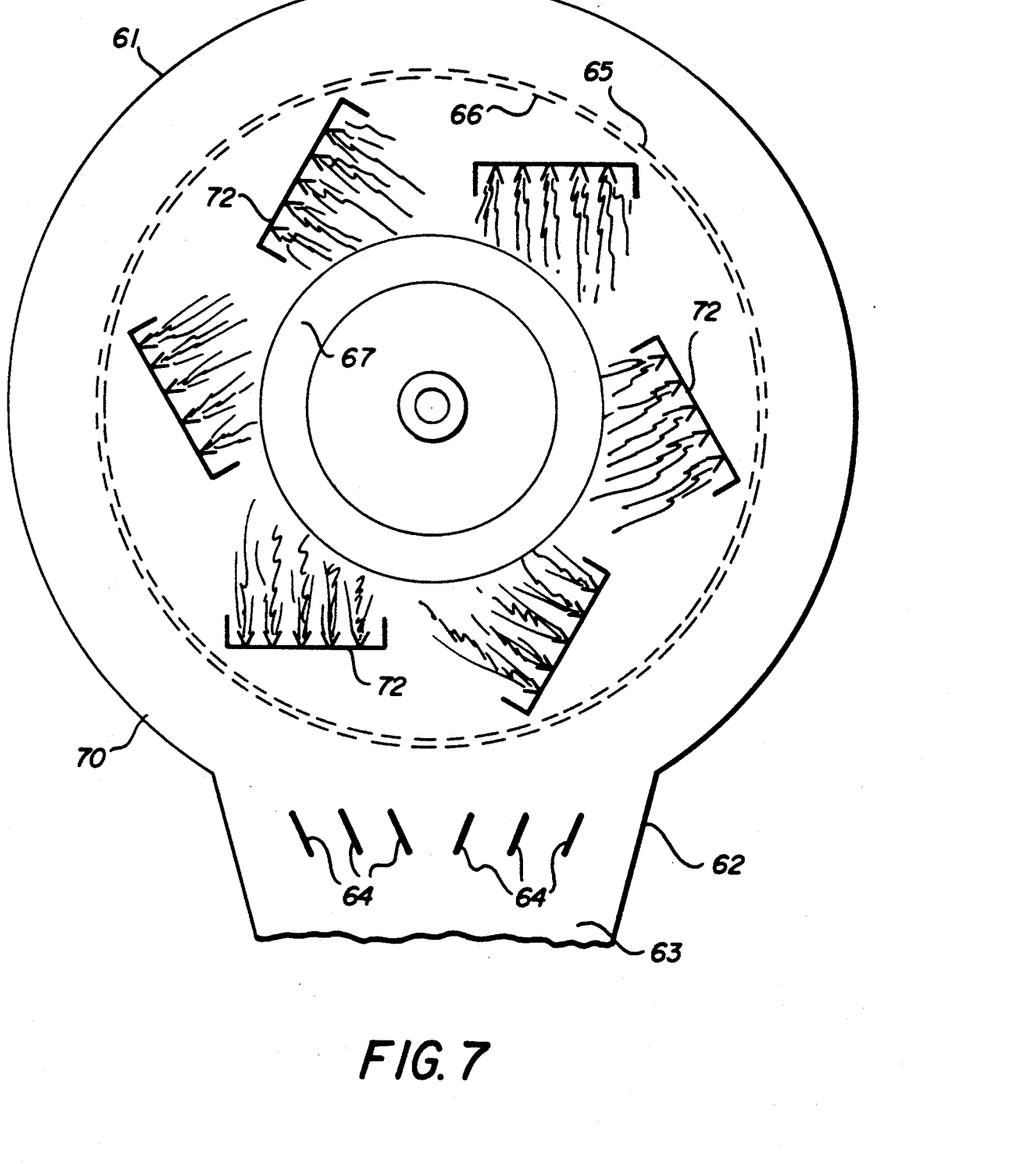
Fig. 7 is a plan view similar to FIG. 5 and showing a modification of the structure shown by FIG. 5.
Figure 8:
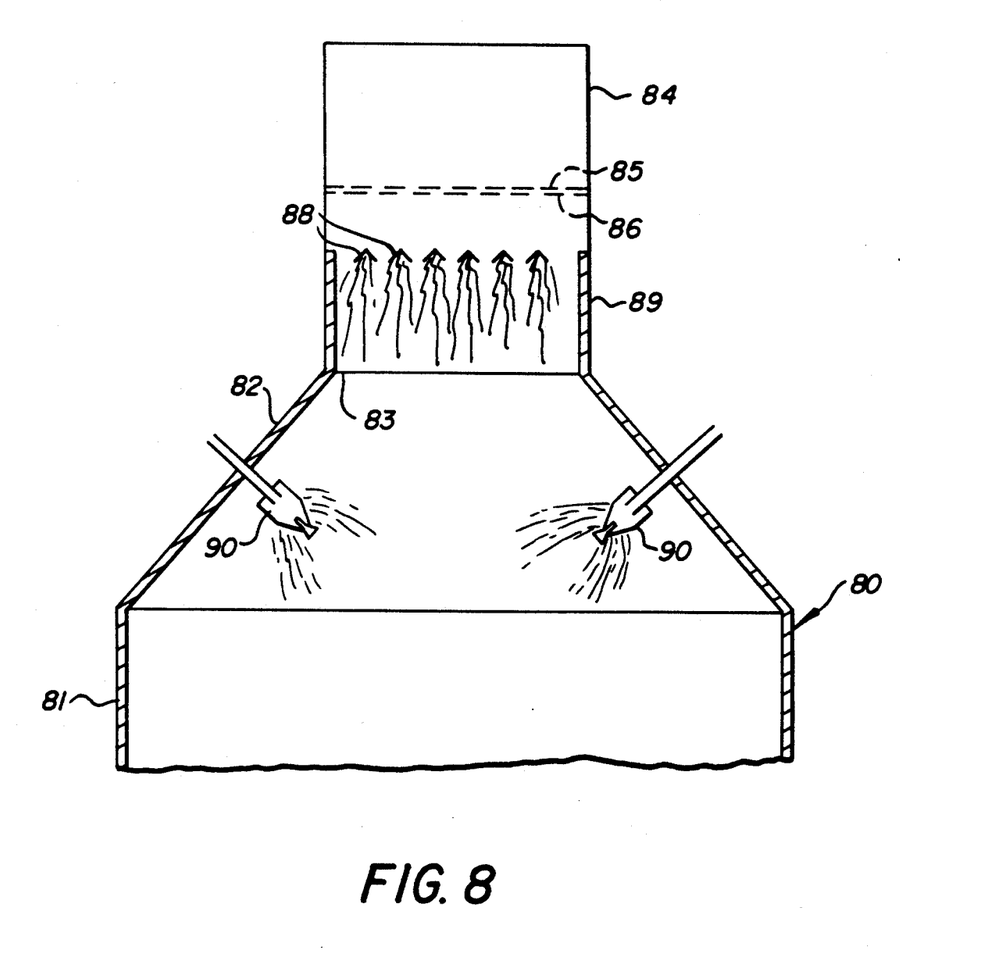
FIG. 8 is a partial elevation view of an alternate embodiment of the spray drying apparatus of the present invention.

FIG. 4 illustrates an alternate annular guide duct 52 which may be utilized in place of the annular guide duct 40 shown by FIGS. 1-3. In FIG. 4, a gas distributor 20 similar to that shown by FIG. 3 distributes a uniform flow of gas to an annular guide duct 52 provided by two radially spaced cylindrical surfaces in the form of the interfacing surfaces of metal plates 53 and 54. A uniform and constant velocity flow of gas is supplied by the gas distributor 22 by means of the vanes 25 and 26 to a mouth 51 of the annular guide duct 52. Directional vanes 49 are provided in the annular guide duct 52 upstream of a pair of annular burners 55 and 56. In this embodiment, a pair of annular shield or guide plates 57 and 58 are provided internally of the annular guide duct 52 to shield the metal plates 53 and 54 from the high temperature of the burners 55 and 56 and the flames issuing therefrom. The guide plate 57 is provided between the burner 55 and a surface of the metal plate 53 and the guide plate 58 is provided between the burner 56 and a surface of the metal plate 54 to provide an insulating flow of cold air between the deflector plates 57 and 58 and the metal plates 53 and 54, respectively, and thereby insulate the metal plates 53 and 54 from the high temperature of the burners 55 and 56 and the flames issuing therefrom.

The annular guide duct 52 of FIG. 4 would operate in the waste effluent spray drying plant shown by FIG. 1 in much the same manner as the annular guide duct 40 shown by FIG. 2. The major difference is that the annular guide duct 52 of FIG. 4 would convey a flow of gas in the form of an annular column of air into the atomization zone concentric with the atomizer wheel 30 rather than providing a flow of drying gas converging toward the atomizer wheel 30.

FIGS. 5 and 6 illustrate an alternate gas distributor and heating device which could be utilized in the high temperature spraying plant of FIG. 1 in place of the gas distributor 20 and annular guide duct 40. In FIGS. 5 and 6 there is shown a banjo shaped gas distributor 60 having a generally circular portion 61 and a radially extending arm 62 providing a processing gas inlet 63 similar to the inlet 21 of the gas distributor 20. A plurality of vanes 64 are provided at the inlet 63 to distribute the processing gas around the interior of the circular portion 61. A pair of circular perforated plates 65 and 66 are provided internally and concentric with the circular portion of the gas distributor 60 to diffuse and provide a gas flow of substantially uniform velocity in the direction of a mouth 67 of an annular guide duct 68. A plurality of vanes such as the vanes 25, 26 of FIG. 2 may also be utilized instead of the perforated plates 65 and 66 to distribute the drying gas.

A plurality of gas burners 69 are provided internally of the gas dispersing perforated plates 65 and 66 in a circumferential array surrounding the mouth 67 of the annular guide duct 68. The perforated plates 65 and 66 serve to supply a gas flow of substantially uniform velocity toward the mouth 67 of the annular guide duct 68. The circumferential array of gas burners 69 serve to uniformly heat the gas flow of substantially uniform velocity vented through the circularly disposed perforated air distribution plates 65 and 66. As shown by FIG. 6, the high temperature flow of ga heated by the burners 69 is conveyed between spaced conical surfaces provided internally of an annular guide duct 68 formed of a refractory material. The annular guide duct 68 conveys the flow of gas from the gas distributor 60 to an outlet 71 where the flow of heated gas is directed in a flow of gas converging toward the atomizing wheel 30.

A gas distributor 70 is shown in FIG. 7 which is a modification of the gas distributor 60. In FIG. 7 a plurality of gas burners 72 are arrayed in a different circular pattern between the perforated plates 65, 66 and the mouth 67 of the annular guide duct 68. In both embodiments, that is, the continuous circumferential array provided by the hexagonal arrangement of the burners 69 in FIG. 5 and the burners 72 which are spaced but still provide a circumferential array of heating means, the flow of gas having a substantially equal velocity venting through the perforated plates 65 and 6 is uniformly heated before it arrives at the mouth 67 of the annular guide duct 68 which conveys the gas to the outlet 71 concentric with the atomizer wheel 30.

FIG. 8 illustrates a spray chamber 80 which is distinctly different from the spray chamber 12 shown by FIG. 1. In FIG. 8 the spray chamber 80 is comprised of a cylindrical wall 81 closed by a top member 82 which converges toward the central axis of the spray chamber and has an opening 83 provided therein. The gas distributor is a cylindrical chamber 84 located adjacent to and above the top member 82 and includes perforated plates 85 and 86 for supplying a flow of gas having a substantially uniform velocity. A plurality of burners 88 are provided internally of a tubular or cylindrical refractory member 89 conveying the flow of gas from the gas distributor 84 to the spray chamber 80. A plurality of spray nozzles 90 are equally spaced around the top member 82. The spray nozzles 90 are distinctly different from the atomizer wheels utilized in the other embodiments and a relatively large number of spray nozzles 90 perhaps as many as 20 to 40 spray nozzles are equally distributed around the top member 82 and the droplets of feed solution material are sprayed internally toward a vertical axis of the spray chamber 80. The processing or drying gas flow supplied by the distributor 84 and heated by the gas burners 88 is directed downwardly in a column having a substantially circular cross section concentric with the plurality of spray nozzles 90 arrayed around the top member 82.

The present invention thus provides an improved gas distributor and heating device which not only facilitates the use of high temperature processing or drying gases; that is, drying gas having a temperature on the order of 715° C. to 1200° C. which was heretofore not economically feasible; but also provides a novel arrangement and structure for heating processing or drying gas while conveying the same directly into a spray drying chamber which provides distinct advantages over prior art systems wherein the processing or drying gas was heated at a location remote from the spray drying chamber in the system delivering the processing or drying gas to a gas distributor. That is, the present invention not only facilitates the use of a drying gas having a temperature substantially greater than that heretofore considered economically feasible, but it also provides a novel arrangement wherein processing or drying gas may be heated after the gas has passed through a distributor for providing an annular flow of gas having a substantially uniform velocity as that gas s being conveyed directly to a spray chamber. The apparatus of the present invention thus offers significant advantages over the prior art practice of heating the processing or drying gas in a delivery system before the gas is provided to a gas distributor and may be also utilized to provide more cost efficient spray drying at conventional temperature ranges.

Although specific embodiments of the invention and several modifications of a gas distributor and an annular guide duct have been disclosed, the present invention is not to be construed as limited to the particular embodiments and forms disclosed herein, since the foregoing description is to be regarded as illustrative rather than restrictive and it should be understood that modifications and variations in details of construction may be made without departing from the spirit and scope of the invention as defined by the claims appended hereto.

What is claimed is:

1. A spray dryer for drying of a feed solution comprising:

a drying chamber having a vertical axis and a drying space concentric with said vertical axis, at least one atomizing means which forms and introduces dispersed droplets of feed solution in said drying space, gas distribution means for supplying a flow of gas having a substantially uniform velocity, means for conveying said flow of gas from said gas distribution means and having an outlet providing a flow of said gas concentric with said at least one atomizing means, said at least one atomizing means being located downstream of said outlet, heating means located between said gas distribution means and said outlet for heating the flow of gas supplied by said gas distribution means, a gas delivery system for providing a continuous flow of gas to said gas distribution means, means for removing powder particles from said chamber, and means for withdrawing gas from said chamber.

2. The spray dryer defined by claim 1, wherein said drying chamber is comprised of a cylindrical wall closed by a top member, an opening in said top member, said at least one atomizing means is comprised of a rotary atomizer wheel projecting through said opening to disperse droplets of feed solution to an atomizing zone in said drying chamber, and said means for conveying said flow of gas from said gas distribution means is comprised of an annular guide duct defined by a pair of spaced surfaces and said outlet directs an annular glow of heated gas toward said atomizing zone.

3. The spray dryer defined by claim 1, wherein said drying chamber is comprised of a cylindrical wall closed by a top member, an opening in said top member, said at least one atomizing means is a rotary atomizer wheel projecting through said opening and introducing said dispersed droplets of feed solution to said drying space, and said means for conveying said flow of gas from said gas distribution means is an annular guide duct defined by two spaced conical surfaces and said outlet directs an annular flow of heated gas converging toward said dispersed droplets of feed solution introduced to said drying space.

4. The spray dryer defined by claim 13, wherein said drying chamber is comprised of a cylindrical wall closed by a top member which converges toward said vertical axis, said gas distribution means is located adjacent said top member, said means for conveying said flow of gas is a conduit directing a flow of heated gas through an opening in said top member, and said at least one atomizing means is comprised of a plurality of spray nozzles equally spaced around and supported by said top member between said opening and said cylindrical wall.

5. The spray dryer defined by claim 1, wherein said means for conveying said flow of gas from said gas distribution means includes a plurality of vanes for directing the flow of said gas in said means.

6. A spray dryer including feed liquid atomizing means in a drying chamber and a gas distributor and heating device comprising:

gas distribution means for supplying a flow of gas having a substantially uniform velocity, means for conveying said flow of gas from said gas distribution means comprising an annular guide duct defined by spaced surfaces having an outlet upstream of said atomizing means and providing an annular flow of gas concentric with said atomizing means, and heating means comprised of at least one gas burner located in said annular guide duct between said gas distribution means and said outlet and extending circumferentially around the interior of said guide duct.

7. The spray dryer defined by claim 6, wherein said annular guide duct is defined by spaced concentric cylindrical surfaces.

8. The spray dryer defined by claim 6, wherein said annular guide duct is defined by spaced conical surfaces.

9. The spray dryer defined by claim 6, wherein said at least one gas burner is disposed to emit gases of combustion in the direction of the outlet of said annular guide duct and further including means internally of said annular guide duct shielding a portion of the gas flow conveyed from said gas distribution means from direct contact with the at least one gas burner and the gases of combustion and thereby providing an insulating flow of gas between at least one side of said annular duct and the temperature of the burner and the gases of combustion.

10. The spray dryer defined by claim 6, wherein said at least one gas burner is disposed to emit a flame in the direction of the outlet and the at least one gas burner is located a greater distance from said outlet than a length of said flame so as to insure that the gases of combustion are completely burned internally of said annular guide duct.

11. The spray dryer defined by claim 6, wherein said at least one gas burner is disposed to emit a flame in the direction of the outlet and the at least one gas burner is located a distance from said outlet which is less than a length of said flame to locate a maximum temperature of the flame upstream of the atomizing means.

12. A spray dryer including feed liquid atomizing means in a drying chamber and a gas distributor and heating device comprising:

gas distribution means comprising a banjo shaped chamber having a circular portion and an arm extending radially relative to said circular portion and providing a supply inlet, an annular outlet in said circular portion and means selected from at least one continuous circular perforated plate and a set of distributor vanes spaced between an interior surface of said circular portion and said annular outlet for distributing a uniform flow of gas from said supply inlet to said annular outlet and supplying a flow of gas having a substantially uniform velocity, means for conveying said flow of gas from said annular outlet of said gas distribution means, and having an outlet upstream of said atomizing means in said drying chamber and providing a flow of said gas concentric with said atomizing means, and heating means located in said means for conveying said flow of gas between said gas distribution means and said outlet.

13. A spray dryer as defined by claim 12, wherein said heating means comprise a plurality of gas burners arranged in a circular pattern for uniformly heating the uniform flow of gas provided by said gas distribution means.

14. The spray dryer defined by claim 12 wherein said means for conveying said flow of gas from said gas distribution means to said outlet is comprised of an annular duct and includes means internally of said annular duct shielding a portion of the gas flow conveyed from said gas distribution means from contact with said heating means and thereby provides an insulating flow of gas between said heating means and at least one side of said annular duct.

15. A spray dryer for drying a feed solution comprising;

a drying chamber having a vertical axis and a drying space concentric with said vertical axis, said drying chamber being closed by a top member having a central opening, a rotary atomizer wheel projecting through said opening and dispersing droplets of feed solution into said drying space, gas distribution means comprising a banjo shaped chamber having a circular portion concentric with the vertical axis of said drying chamber and an arm extending radially relative to said circular portion and providing a supply inlet to said circular portion, said circular portion includes an annular outlet, and at least one circular gas diffuser between an interior surface of said circular portion and said outlet for distributing a uniform flow of gas from said supply inlet to said annular outlet and supplying a flow of gas having a substantially uniform velocity, means for conveying said flow of gas from said gas distribution means and having an outlet directing an annular flow of feed solution dispersed by said atomizer wheel, heating means located between said gas distribution means and said outlet for heating the flow of gas supplied by said gas distribution means, a gas delivery system for providing a continuous flow of gas to said gas distribution means, means for removing powder particles from said chamber, and means for withdrawing gas from said chamber.

16. The spray dryer defined by claim 15, wherein said heating means comprises a plurality of gas burners arrayed in a circular pattern adjacent said circular gas diffuser.

17. The spray dryer defined by claim 15, wherein said at least one circular gas diffuser is comprised of at least one perforated plate.

18. The spray dryer defined by claim 15 wherein said means for conveying said flow of gas from said gas distribution means to said outlet is comprised of an annular duct and includes means internally of said annular duct shielding a portion of the gas flow conveyed from said gas distribution means from contact with said heating means and thereby provides an insulating flow of gas between said heating means and at least one side of said annular duct.

19. A spray dryer for drying a feed solution comprising;

a drying chamber having a vertical axis and a drying space concentric with said vertical axis, said drying chamber being closed by a top member having a central opening, a rotary atomizer wheel projecting through said opening and dispersing droplets of feed solution into said drying space, gas distribution means for supplying a flow of gas having a substantially uniform velocity, means for conveying said flow of gas from said gas distribution means comprising an annular guide duct defined by two spaced conical surfaces having an outlet upstream of said atomizer wheel and providing an annular flow of gas converging toward said droplets of feed solution dispersed by said atomizer wheel, heating means comprised of at least one gas burner provided in said annular guide duct between said spaced conical surfaces and extending circumferentially around said guide duct, a gas delivery system for providing a continuous flow of gas to said gas distribution means, means for removing powder particles from said chamber, and means for withdrawing gas from said chamber.

20. The spray dryer defined by claim 19, and further including means deflecting a portion of said gas supplied by said gas distribution means to bypass said at least one gas burner and gases of combustion to provide a flow of gas insulating at least one of said conical surfaces from the temperature of said at least one gas burner and said gases of combustion.

21. A spray dryer including feed liquid atomizing means in a drying chamber, a gas supply duct and a gas distributor and heating device comprising:

gas distribution means for supplying a flow of gas having a substantially uniform velocity, means for conveying said flow of gas from said gas distribution means and having an outlet upstream of said atomizing means in said drying chamber and providing a flow of said gas concentric with said atomizing means, said gas distribution means comprising a horizontal spiral supply duct of constantly decreasing cross section having a plurality of vanes for uniformly distributing an annular supply of pressurized gas from said supply duct to said means for conveying said flow of gas, and a plurality of gas burners arranged in a circular pattern and located in said means for conveying said flow of gas between said gas distribution means and said outlet for uniformly heating the flow of gas supplied by said gas distribution means.

22. The spray dryer defined by claim 21 wherein said means for conveying said flow of gas from said gas distribution means to said outlet is comprised of an annular duct and includes means internally of said annular duct shielding a portion of the gas flow conveyed from said gas distribution means from direct contact with the burner and gases of combustion and thereby providing an insulating flow of gas between at least one side of said annular duct and the temperature of the burner and the gases of combustion.

23. A spray dryer including feed liquid atomizing means in a drying chamber and a gas distributor and heating device comprising:

gas distribution means for supplying a flow of gas having a substantially uniform velocity, means for conveying said flow of gas from said gas distribution means, said means for conveying said flow of gas having an outlet upstream of said atomizing means in said drying chamber, including a plurality of vanes provided internally of said means to direct the flow of gas in a desired direction and providing a flow of said gas concentric with said atomizing means, and heating means located in said means for conveying said flow of gas between said gas distribution means and said outlet.

24. The spray dryer defined by claim 23 wherein said means for conveying said flow of gas from said gas distribution means to said outlet is comprised of an annular duct and includes means internally of said annular duct shielding a portion of the gas flow conveyed from said gas distribution means from contact with said heating means and thereby provides an insulating flow of gas between said heating means and at least one side of said annular duct.

* * * * *